United States Patent [19]

Mertens

[11] 3,756,372

[45] Sept. 4, 1973

[54] APPARATUS FOR REMOVAL OF STORED MATERIAL FROM STORAGE CONTAINERS

[75] Inventor: Johann Mertens, Santa Cruz, Calif.

[73] Assignee: Nuclear Waste Systems Company, Campbell, Calif.

[22] Filed: Feb. 24, 1971

[21] Appl. No.: 118,422

[52] U.S. Cl. ..................... 198/64, 198/229, 222/413
[51] Int. Cl. ....................... B65g 47/16, G01f 11/20
[58] Field of Search ............ 222/148, 227, 233–234, 222/413, 196, 243–244; 198/64, 229

[56] References Cited
UNITED STATES PATENTS

| | | | |
|---|---|---|---|
| 2,908,425 | 10/1959 | Denson | 222/413 X |
| 2,526,735 | 10/1950 | Duce | 222/196 |
| 2,512,451 | 6/1950 | Withall | 222/243 X |
| 2,418,540 | 4/1947 | Bressler | 198/213 |

FOREIGN PATENTS OR APPLICATIONS

| | | | |
|---|---|---|---|
| 486,556 | 4/1918 | France | 222/413 |

*Primary Examiner*—Edward A. Sroka
*Attorney*—Jack M. Wiseman

[57] ABSTRACT

Apparatus for use in conjunction with large storage and settling containers containing stored material. The apparatus aids in removing said material from the container with a remotely controlled operation. The apparatus includes a housing supporting a receiver trough opening to receive material from an opening of the container. An auger conveyor is supported within the trough for removing material from the trough. A sliding bulkhead is supported by the housing for opening and closing access between the trough and container. A bulkhead retrieval mechanism controls the bulkhead. The auger moves the material from the receiving trough to a receiving drum located near a discharge valve opening to the trough. The trough and auger include individual sections which may be assembled and disassembled for purposes of maintenance and repair without removal of the housing and the material from the container.

11 Claims, 3 Drawing Figures

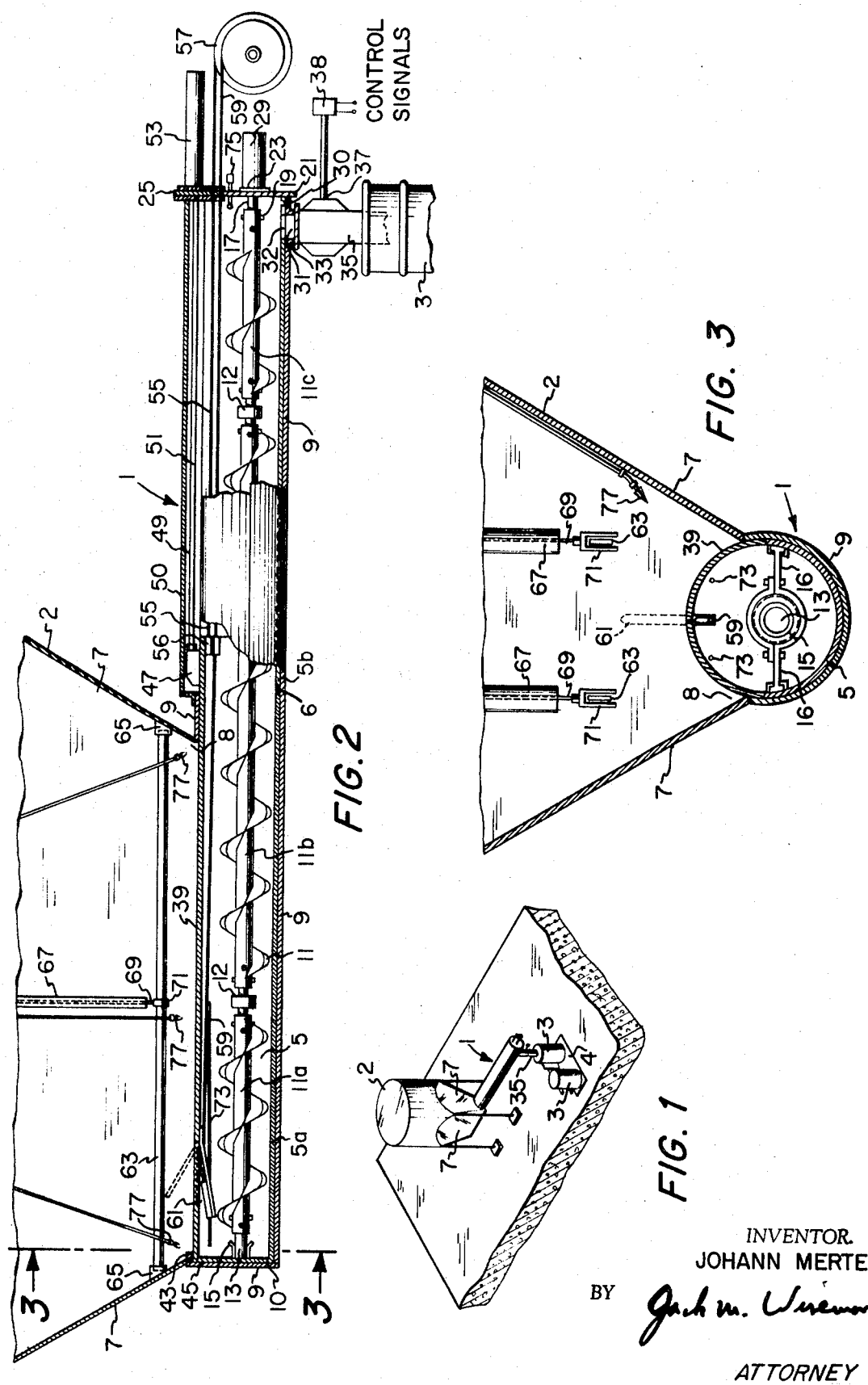

APPARATUS FOR REMOVAL OF STORED MATERIAL FROM STORAGE CONTAINERS

BACKGROUND OF THE INVENTION

The present invention pertains to apparatus for use in conjunction with containers, such as storage or settling tanks or bins, containing large volumes of materials that are preferably removed from the tank with a remotely controlled operation. For example, as in industrial nuclear power plants, storage and settling tanks may carry radioactive waste materials hazardous or dangerous to an individual's safety or health. Removal of such materials is preferably performed without undue exposure of an individual. Furthermore, in various applications it is desirable to remove settled materials without first having to slurry and then pump them from the tank to a centrifuge or other dewatering equipment. This is desirable in handling radioactive waste such as filter sludge, demineralizer resins and filter-demineralizer sludge or mixtures thereof after storage in large settling tanks.

A patent of interest is the U.S. Pat. to Blanshine, No. 3,306,433, issued on Feb. 28, 1967, for Conveyor.

SUMMARY OF THE PRESENT INVENTION

The present invention provides apparatus mountable to a large storage or settling container, e.g., a tank or bin. The apparatus is adapted to remove and transport, without further processing, settled material directly from the storage or settling container to an external position, e.g., a loading platform carrying smaller individual transport containers.

The present apparatus includes means for achieving positive discharge and removal of the contained material from an opening in the storage or settling container. A receiver trough supporting an auger conveyor whose operation is controlled remotely, receives the material through the opening. The conveyor moves the material to a discharge valve opening to the transport containers at the loading platform. A controlled movable bulkhead responsive to a control mechanism regulates access of the discharge path between the container and receiver trough. Vibrator means may be included to vibrate the material from the container to a receiver trough of the conveyor to facilitate discharge of the material.

The entire conveyor assembly is adapted for complete enclosure during operation. The conveyor assembly including the receiving trough and auger may comprise individual segments readily assembled and disassembled for purposes of installation, maintenance and repair. This may be accomplished without disturbing the housing and bulkhead and without exposure to material within the container. After installation, the conveyor assembly may be maintained without the necessity of removal of the material in the container and without undue hazard to the safety and health of maintenance personnel performing repair work. The apparatus is adapted for attachment to existing storage or settling containers.

BRIEF DESCRIPTION OF THE DRAWINGS

FIG. 1 illustrates in general an application of the present invention in conjunction with a large storage and settling tank;

FIG. 2 is a side view of a conveyor or assembly in accordance with the present invention; and FIG. 3 is a view of the assembly of FIG. 2 taken along the line 3—3.

DESCRIPTION OF A PREFERRED EMBODIMENT

FIG. 1 illustrates a conveyor assembly, referred to by the general reference character 1, embodying the present invention. The assembly 1 is mounted for removal of waste sludge material discharged from a storage container 2 to individual transport containers 3, e.g., 55 gallon drums resting on a platform 4. For example, the container 2 may be a large storage or settling tank containing radioactive waste material produced at an industrial nuclear power plant.

FIG. 2 illustrates in a partially cross-sectional and partially sectioned view the conveyor assembly 1. The assembly 1 includes an arcuate receiving trough 5 including a first part 5a and a second part 5b joined at a common joint 6. The joint 6 is preferably of a slideable type in which the parts 5a and 5b are slid into engagement responsive to pressure and then locked. The part 5a of the receiving trough 5 is adapted for placement near the bottom of the tank 3 to receive discharged material. As depicted, the tank 2 includes a set of side walls 7 forming a bottom opening 8. As depicted, the side walls 7 funnel into the part of the receiving trough 5 formed by the part 5a. The part 5a and 5b of the receiving trough 5 are supported by an arcuate support channel member 9. The channel member 9 extends the full longitudinal length of the assembly 1 from the opening 8 in the container 2 to the transport container 3 resting on the platform 4. The edges of the channel member 9, above its center line, engage the edges of the walls 7 at the opening 8. The parts 5a and 5b of the trough 5 are slideable within the channel member 9 with the part 5a carrying a circular end plate 10.

Parallel with the axis of the channel member 9 and the trough 5 is a segmented auger 11 supported within and extending the length of the receiving trough 5. The auger 11 includes a plurality of segments 11a, 11b and 11c joined at individual pressure engaging couplings 12. The couplings 12 provide for locked coupling when in engagement and slideable pressure means for taking the segments in and out of engagement. For example, the couplings 12 may include slots and studs in which the studs of one segment may be slid through the slots of another segment and then turned in locking engagement. The auger 11 is supported by a bearing 13 resting within a rib cup 15. The rib cup 15 is supported by the end plate 10 and the side walls of the part 5a by a pair of support arms 16. The rib cup 15 is adapted to receive the end of the auger 11 by sliding the auger in place. The auger 11 is supported at the other longitudinal end of the channel member 9 by a bearing 17 secured thereto by a fastener pin 19. The bearing 17 is supported by a circular end plate 21 through which the bearing protrudes.

A sealer 23 seals the area about the end plate 21 and bearing 17 to avoid escape of conveyed material. The end plate 21 is held in place by a slot formed by a set of arcuate slats 25 and the engagement of a hydraulic auger motor 29 with the bearing 17. The motor 29 drives the auger 11 so as to rotate the auger within the receiving trough 5. It may further be noted that near the end of the part 5b of the trough 5 there is a hook engaging notch 30.

Also near the end plate 21 is an opening 31 extending through the channel member 9 and an opening 32 extending through the part 5b. The openings 31 and 32 form in part a discharge portal for the material moved by the auger 11. Joining the opening 31 is a sleeve 33 adapted to engage a discharge valve 35. The discharge valve 35 may open and close access to the transport container 3 from the trough 5 through the openings 31 and 32. The valve 35 responds to a control arm 37 to control discharge of waste to the individual transport containers 3. The control arm 37 may be remotely controlled by an electro-mechanical apparatus 38, e.g., relay, motor, receiving remotely generated control signals.

Intermediate the auger 11 and the container opening 8, is a movable arcuate shaped bulkhead 39 adapted to be moved linearly in a direction parallel to the axis of the auger 11. The bulkhead 39 is positioned to control access between the opening 8 and the trough 5 so as to interrupt discharge of material through the opening 8 to the trough 5. The bulkhead 39 at one end engages an arcuate slot created by a pair of arcuate members 43 and 45 supported by the end of the channel member 9. As may be noted in FIG. 3, the bulkhead 39 complements the side walls of the trough part 5a to form an enclosure.

In the exemplary embodiment, the radius of the trough 5 and bulkhead 30 are the same with that of the channel member 9 larger and forming an overlap of the trough-bulkhead junction. As shown in FIG. 3, the bulkhead 39 slides along the overlap of the channel member 9 to provide a secure junction between the trough 5 and the container 2. The other end of the bulkhead 39 is secured to a shoe guide 47. The shoe guide 47 is supported within a slot 49 formed by a housing 50 joining the channel member 9. Joining the shoe 47 is a telescope piston 51 within the slot 49 and extending to an externally located hydraulic actuator 53. The piston 51 extends through the wall formed by the slats 25. Accordingly, the hydraulic actuator 53 actuates the longitudinal movement of the piston 51 which in turn controls longitudinal movement of the bulkhead 39.

The bulkhead 39 is joined to a cable member 55 at a junction 56. The other end of the cable 55 extends to a winch 57. The winch 57 also carries a cable 59 extending to a spike member 61 which is positioned within the area of the opening 8 and the receiving trough 5. The spike 61 is pivotably responsive to the cable 59 about an axis. Thus, when the winch 57 is rotated to retract the bulkhead 39, the spike 61 assumes a vertical position within the confines of the cavity formed by the walls 7 of the container 2 to loosen material contained therein. It may be noted that the bulkhead 39 is independent from the trough 5 such that the trough parts 5a and 5b and the auger segments 11a, 11b and 11c can all be removed independent of the bulkhead 39.

Within the cavity formed by the container walls 7 there may be included vibrator bands 63 supported on opposing walls by the support journals 65. The bands are excited by electromagnetic oscillators 67. The oscillators 67 each have a solenoid arm 69 joined at one end by a hammer 71 which reciprocates with the arm 69 and vibrates the band 63.

It may further be noted that within the receiving trough 5 and the channel member 9 there are washout tubes 73. These washout tubes may carry a plurality of spouts to create a spray within the trough 5 and the channel member 9. A water nozzle 75 may also be carried by the end plate 21 to spray water in the forward section of the receiving trough 5 and the auger 11. As further illustrated in the drawings, the tank 2 itself may carry spray nozzles 77 to provide additional means to loosen the material should bridging occur within the tank 2.

The conveyor assembly operation will now be described. When no waste material is to be removed from the tank 2, the bulkhead 39 is in a forward "left" position as shown. When sludge or other material is to be removed from the tank 2, the bulkhead 39 is retracted into the cavity 49 by the winch 57 and cable 55. Simultaneously, the spikes 61 are raised through action of the cable 59 to loosen the material immediately above the bulkhead 39 in the container 2. Assuming the container 2 carries a vibrator means as illustrated, the vibrator bands 63 are excited by the electromagnetic oscillators 67. This urges discharge of the waste material into the receiver trough 15. The hydraulic motor 29 drives the auger 11 such that the waste material is moved along the trough 15 through the portal of the openings 31 and 32 through the sleeve 33 and to the output valve 35 into the transport drums 3 on the platform 4. After the desired quantity of waste has been removed, the bulkhead 39 is advanced "forward" by the hydraulic actuator 53 through action of the telescopic piston 51. The shoe 47 and the piston 51 move in the slot 49 formed by the housing 50. When the bulkhead 39 is in the "forward" position, the opening 8 is closed. Also, the spikes 61 are in their "horizontal" position. Assuming it is desired to perform maintenance operations on the conveyor assembly 1, water is injected through the spray nozzles 73 and 75 to wash and clean the auger 11, the sleeve 33, and the trough 5.

After washing, the assembly 1 may be disassembled for further maintenance operations. The end plate 21 is first removed. Then, segment 11c of the auger 11 is removed. Part 5b of the trough 5 is exposed and slid out by engaging a cable hook or other pulling means to the notch 30. Parts 5a and 5b of the trough 5 are simultaneously slid along the channel member 9 until the joint 6 is beyond the end of the opening left by removal of the end plate 21. The joint 6 is then broken to separate the parts 5a and 5b. The auger parts 11b and 11a may be segmented and part 11b removed. Now, the part 5a of the trough 5 and the auger section 11a are removed. Reinstallation follows the reverse procedure. Thus, removal and installation of the auger 11 and trough 5 may be completed without having to remove material from the tank 2. Furthermore, the bulkhead 30, in retaining the waste material above the conveyor assembly 1, prevents radiation from passing through the channel member 9 during periods when no waste is being removed thus rendering the filling area safe.

I claim:

1. A conveyor assembly for removal of stored material from storage containers, the assembly comprising in combination:

a support channel member received by an opening to a container from which stored material is to be removed, the support channel member forming a longitudinal channel;

trough receiving means disposed within said longitudinal channel member for receiving material conducted through said opening, said trough means being supported by said channel member, said trough means being slidable within said support channel member and being adapted to be separated from said support channel member;

an auger supported within said trough receiving means for removing from said trough means material received thereby;

discharge means extending to said trough means and spaced from said opening for discharging material advanced by said auger; and retractable bulkhead means intermediate said trough receiving means and said opening for controlling access between said opening and said trough receiving means, said bulkhead means being supported by said support channel member independent from said trough receiving means.

2. A conveyor assembly as claimed in claim 1 in which said trough means includes a plurality of segmented units joined together within the channel member and separable from each other outside the channel member.

3. A conveyor assembly as claimed in claim 2 in which said auger includes a plurality of auger segments joined together within said trough means and separable from each other outside said trough means.

4. A conveyor assembly as claimed in claim 3 and further including retractable loosening means responsive to movement of said bulkhead means, said loosening means protruding within said opening when said bulkhead means is retracted for loosening material within said opening.

5. A conveyor assembly as claimed in claim 3 in which the segmented units of said trough means include means for slideable pressure coupling and said auger segments include means for slideable pressure coupling.

6. A conveyor assembly as claimed in claim 5 and further including a removable end cover supported by said support channel member about an end opening of said channel member, said auger segments and said segmented units of said trough means being removable through said end opening.

7. A conveyor as claimed in claim 3 and further including remote mechanical means engaging said bulkhead means for driving said bulkhead means to various positions for controlling access between said opening and said trough receiving means.

8. A conveyor as claimed in claim 1 and further including remote mechanical means engaging said bulkhead meand for driving said bulkhead means to various positions for controlling access between said opening and said trough receiving means.

9. A conveyor assembly as claimed in claim 8 in which said remote mechanical drive means includes an hydraulic actuator coupled to said bulkhead means.

10. A conveyor assembly for removal of stored material from storage containers, the assembly comprising in combination:

a support channel member received by an opening to a container from which stored material is to be removed, the support channel member forming a longitudinal channel;

trough receiving means disposed within said longitudinal channel member for receiving material conducted through said opening, said trough means being supported by said channel member, said trough means being slideable within said channel member and being adapted to be separated from said support channel member, said trough means includes a plurality of segmented units joined together within the channel member and separable from each other outside the channel member;

an auger supported within said trough receiving means for removing from said trough means material received thereby, said auger includes a plurality of auger segments joined together within said trough means and separable from each other outside said trough means;

discharge means extending to said trough means and spaced from said opening for discharging material advanced by said auger;

retractable bulkhead means intermediate said receiving trough receiving means and said opening for controlling access between said opening and said trough receiving means, said bulkhead means being supported by said support channel member independent from said trough receiving means; and remote mechanical means engaging said bulkhead means for driving said bulkhead means to various positions for controlling access between said opening and said trough receiving means, said remote mechanical drive means include an hydraulic actuator coupled to said bulkhead means.

11. A conveyor assembly for removal of stored material from storage containers, the assembly comprising in combination:

a support channel member received by an opening to a container from which stored material is to be removed, the support channel member forming a longitudinal channel;

trough receiving means disposed within said longitudinal channel member for receiving material conducted through said opening, said trough means being supported by said channel member, said trough means being slideable within said channel member and being adapted to be separated from said support channel member, said trough means includes a plurality of segmented units joined together within the channel member and separable from each other outside the channel member;

an auger supported within said trough receiving means for removing from said trough means material received thereby, said auger includes a plurality of auger segments joined together within said trough means and separable from each other outside said trough means;

discharge means extending to said trough means and spaced from said opening for discharging material advanced by said auger;

retractable bulkhead means intermediate said receiving trough receiving means and said opening for controlling access between said opening and said trough receiving means, said bulkhead means being supported by said support channel member independent from said trough receiving means;

remote mechanical means engaging said bulkhead means for driving said bulkhead means to various positions for controlling access between said opening and said trough receiving means; and cleaning fluid discharge ports within said support channel member for cleaning the interior of said trough receiving means and said auger.

* * * * *